United States Patent
Ruissen et al.

(10) Patent No.: US 9,073,707 B2
(45) Date of Patent: Jul. 7, 2015

(54) BUFFER SYSTEM FOR FRUIT SUCH AS APPLES

(75) Inventors: Hendrik Krijn Ruissen, Tricht (NL); Jan Van Der Vlist, Tricht (NL)

(73) Assignee: De Greef's Wagen-, Carrosserie-En Machinebouw B.V., Tricht (NL)

( * ) Notice: Subject to any disclaimer, the term of this patent is extended or adjusted under 35 U.S.C. 154(b) by 53 days.

(21) Appl. No.: 13/576,279

(22) PCT Filed: Feb. 22, 2011

(86) PCT No.: PCT/NL2011/050123
§ 371 (c)(1),
(2), (4) Date: Oct. 5, 2012

(87) PCT Pub. No.: WO2011/105895
PCT Pub. Date: Sep. 1, 2011

(65) Prior Publication Data
US 2013/0051932 A1    Feb. 28, 2013

(30) Foreign Application Priority Data

Feb. 23, 2010 (NL) .................................. 2004288
Jul. 22, 2010 (NL) .................................. 2005127

(51) Int. Cl.
*B65G 53/58* (2006.01)
*B65G 51/01* (2006.01)
*B65B 25/04* (2006.01)

(52) U.S. Cl.
CPC ............... *B65G 51/01* (2013.01); *B65B 25/045* (2013.01)

(58) Field of Classification Search
CPC .............................. B65B 25/045; B65G 51/01
USPC ............................................................ 406/83
See application file for complete search history.

(56) References Cited

U.S. PATENT DOCUMENTS

| | | | | | |
|---|---|---|---|---|---|
| 2,196,451 | A | * | 4/1940 | Holzer | 209/17 |
| 2,578,808 | A | * | 12/1951 | Johnson et al. | 209/173 |
| 3,470,670 | A | * | 10/1969 | Gorin | 53/473 |
| 3,643,400 | A | * | 2/1972 | Barbet | 53/248 |
| 3,656,272 | A | | 4/1972 | Sheetz | |
| 3,701,565 | A | * | 10/1972 | Gutterman et al. | 406/46 |
| 3,704,041 | A | | 11/1972 | Loveland et al. | |
| 4,051,645 | A | * | 10/1977 | Warkentin | 53/248 |
| 4,064,683 | A | * | 12/1977 | Tennes et al. | 56/340.1 |
| 4,194,922 | A | * | 3/1980 | Gransell et al. | 134/1 |
| 4,225,424 | A | * | 9/1980 | Patzlaff | 209/3.1 |
| 4,320,995 | A | * | 3/1982 | Tennes et al. | 406/39 |
| 4,375,264 | A | * | 3/1983 | Porter | 209/606 |
| 4,700,547 | A | * | 10/1987 | Hayashi | 62/65 |
| 4,807,422 | A | * | 2/1989 | Blanc | 53/248 |

(Continued)

FOREIGN PATENT DOCUMENTS

EP    0358847 A1 *   3/1990
GB    1571400 A  *   7/1980

(Continued)

*Primary Examiner* — William R Harp
(74) *Attorney, Agent, or Firm* — The Webb Law Firm

(57) ABSTRACT

The present invention relates to a buffering device and method for buffering products such as apples. The device according to the invention comprises: a liquid; a supply means wherein during use an entry side is operatively connected to a feed channel and an exit side of the supply means is provided below the liquid level in the basin, such that during use products are buffered substantially in vertical direction.

21 Claims, 6 Drawing Sheets

(56) References Cited

U.S. PATENT DOCUMENTS

| | | | | |
|---|---|---|---|---|
| 5,078,579 A | * | 1/1992 | Ryan | 417/126 |
| 5,242,250 A | * | 9/1993 | Compagnoni | 406/73 |
| 5,878,562 A | * | 3/1999 | Cernusco | 56/328.1 |
| 6,840,715 B2 | | 1/2005 | Crovara Pescia | |
| 7,159,373 B2 | * | 1/2007 | Blanc | 53/244 |
| 2003/0180102 A1 | | 9/2003 | Pescia | |

FOREIGN PATENT DOCUMENTS

| | | |
|---|---|---|
| NL | 7113846 A | 6/1972 |
| WO | 0185584 A1 | 11/2001 |

* cited by examiner

BUFFER SYSTEM FOR FRUIT SUCH AS APPLES

BACKGROUND OF THE INVENTION

1. Field of the Invention

The present invention relates to a buffering device for buffering floating products, in particular floating fruit such as apples.

2. Description of Related Art

The buffering of floating fruit such as apples in a water channel is known in practice. The surface area of the water channel must have a size here such that the quantity of apples with which one crate of in practice about 400 kg of apples can be filled floats on the water. With this method of buffering a considerable water surface area is necessary, and a large installation area is therefore required. 30 to 60 parallel water channels with a surface area of about 10 $m^2$ per water channel are usual in practice.

The object of the present invention is to improve the buffering of products, and particularly of floating fruit such as apples, such that the whole operation involving the handling of said products can be performed with a greater efficiency in respect of the surface area use.

SUMMARY OF THE INVENTION

This object is achieved with the buffering device for floating products according to the invention, the device comprising:
  a liquid basin;
  a supply means wherein during use an entry side is operatively connected to a feed channel and an exit side of the supply tube is provided below the liquid level in the basin, such that during use products are buffered substantially in vertical direction.

Providing a liquid basin in which a liquid, preferably water, is arranged enables the floating products, preferably fruit such as apples, to be carried therein. By supplying the products via a supply means, wherein a first entry side is operatively connected to and connects to a feed channel, and wherein the second exit side is provided under water in the liquid basin, at least during use thereof, products are carried from below into the liquid basin. Surprisingly, it has been found here that introducing products from below, i.e. from below the liquid level in the basin, results in a more product-friendly buffering with less damage to the products. An explanation for this is the reduced impact which products have on each other during buffering compared to for instance dropping the products into the basin from above.

The feed channel is here preferably a water channel, wherein the water flow is urged as transport medium through the supply tube and herein entrains the products. Alternatively, products are supplied via a conveyor belt or the like and introduced into the bottom of the basin. Having arrived in the bottom of the liquid basin, the products will tend to float and move in the direction of the water surface in the liquid basin. The first products will begin to float on the water surface while later products rest against the underside of the already arranged products. This creates layers with buffered products in the liquid basin. The products are hereby buffered in layers in vertical direction. It has been found in practice that, in the case of apples, 5 to 6 layers can be arranged without causing damage to the product. The surface area required for buffering of for instance apples can hereby be reduced from 10 $m^2$ per water channel to about 2 $m^2$ per water channel.

In a preferred embodiment according to the invention recommended at present the supply means comprises a supply tube. A controlled transfer of products to the basin can hereby be realized. The tube can be formed as round pipe, rectangular tube, bent plate. Other forms are also possible.

In the case the buffering device according to the invention is combined with a sorting device, wherein diverse sorting groups, for instance 5 groups, are provided and for instance 30 to 60 water channels are therefore required, wherein a number of 50 water channels is usual in practice, the required installation area is reduced by about 400 $m^2$. Installation costs for both labour and material are hereby greatly reduced.

An additional advantage is that the quantity of liquid used, preferably water, can be further limited. The buffered quantity is preferably adjusted to the content of a single crate, i.e. in practice usually about 400 kilos. Once the basin has been filled with the desired quantity of products, they can be transported further for further processing, including packaging and storage. If desired, it is possible to fill a crate directly from the liquid basin.

The flow speed through and the diameter, length and placing angle of the flow tube/supply tube depend here on, among other factors, the type of fruit. The apples for instance are thus fed from the underside into the basin or vessel and, owing to their buoyancy, stacked in multiple layers in the liquid, such as the water.

As soon as the quantity of apples for one crate has been buffered in the water vessel, the supply is preferably cut off and the buffered quantity of apples is discharged via a water channel to the filling machine with which the crate is filled.

It is further noted that when handling products, particularly floating fruit such as apples, a fruit-friendly treatment is of essential importance in preventing irreversible damage such as bruising to these products. It is found in practice that this fruit-friendliness is not usually realized and products therefore usually emerge damaged from the whole transport. The buffering of products is a source of damage which cannot be disregarded here.

The above outlined problem is countered with the preferred embodiment according to the present invention, wherein the buffering device comprises guide means for product-friendly guiding of the supplied products.

By providing guide means the transition of the products from a feed channel to a liquid basin in which the products can be buffered can be performed in product-friendly, and more particularly fruit-friendly manner. Damage such as bruising to these fruits is prevented here and the quality, and thereby the value, is retained.

Said guide means preferably comprise a liquid level regulator with which during use the liquid level in the feed channel is regulated at the position of the change in direction of the products at the entry side of the supply means in the form of a supply tube. A cross-section of this supply tube is hereby filled substantially wholly with liquid. Using the supply tube the products supplied via the feed channel are transported in a usually obliquely downward direction to the underside of the liquid basin. This change in direction occurs abruptly, or preferably somewhat gradually, wherein the substantially horizontal direction of movement transposes into a partially downward oriented direction of movement of the products. Surprisingly, it has been found that damage to the products can be greatly reduced by completely filling the supply tube with the liquid at the position of this transition. The flow of the products in this way becomes gentler, and the impact on for instance the side walls of the supply tube resulting from this change in direction is greatly reduced as a result.

During use the guide means preferably maintain a liquid level difference between the feed channel and the basin. By realizing this level difference an accelerating effect can be exerted on the products at the position of the supply tube. This has the result, among others, that the mutual distance between these products is increased at the position of the supply tube, whereby fewer collisions, and therefore less damage to the products, will occur.

In advantageous preferred embodiments the guide means can further comprise a conveyor belt, carriers, brushes, wheels, drums and/or jacks. The displacement of the products from the feed channel to the liquid basin can in this way be further controlled. Said guide means can serve as supply means. In an alternative embodiment however, these guide means are combined with the supply tube by being provided thereon or therein.

Some of the stated measures are preferably combined with each other. In one presently preferred embodiment according to the invention it is thus possible for instance to combine both a level difference and the height of the liquid level. The transport tube can take diverse forms. The tube can be completely closed as well as being for instance a reverse gutter form. The tube can further take a round, oval or rectangular form. Other forms are also possible. The form and dimensions of the transport tube depend on, among other factors, the products to be transported. The liquid used is preferably water. It is however also possible to use other liquids, such as for instance a mixture of water with a lighter substance, such as an oily substance. The density of the liquid can hereby be influenced, and the buoyant force thereby manipulated.

In an advantageous preferred embodiment according to the present invention the buffering device comprises pivoting means connected to the supply means.

Providing pivoting means makes it possible to position the supply means, such as the supply tube, in the liquid basin as desired. This means that the outlet or exit opening of the supply tube can be oriented. It is hereby possible to guide the products carried into the liquid basin in more direct manner to the desired position in the basin. This avoids, among other things, unnecessary mutual contact between products. This results in a further reduction in possibly occurring damage to the products. The pivoting means are horizontal and/or vertical pivoting means. Using the horizontal pivoting means it is possible to move the exit side of the supply tube in the horizontal plane, i.e. from left to right in the liquid basin. In this way the liquid basin can be filled in effective manner. The vertical pivoting means enable a movement from the exit side of the supply tube in height direction, i.e. the vertical direction. This means that the products can be carried from the supply tube to a suitable height as desired in the liquid basin. The position in the liquid basin where the supplied products come to lie can in this way be controlled, together with the speed at which the products flow through the supply tube. Both types of pivoting means are preferably combined in an advantageous embodiment.

The supply means, preferably in the form of a supply tube, can preferably be adjusted in length direction. A product can in this way be introduced at both the front and rear of the liquid basin so that unnecessary collisions are avoided. It is here also possible to combine this with the horizontal and/or vertical pivoting means.

In an alternative embodiment or an embodiment combined herewith, more than one supply tube is provided per liquid basin. In this way the distribution of the products over the liquid basin can also be influenced and further improved.

In a further advantageous preferred embodiment according to the present invention the supply tube is provided with a shut-off valve.

By providing a shut-off valve which can be placed at the entry, exit or on the inside of the supply tube, this latter can be closed, so preventing further products being supplied to the liquid basin. This is relevant for instance when the quantity of buffered products corresponds to the quantity desired for instance for a crate.

The shut-off valve is preferably combined with circulation means for the liquid basin. After closing of the shut-off valve a circulating flow is hereby initiated or intensified in the liquid basin in order to realize further transport of the buffered quantity of products. It is hereby possible in effective manner to empty the liquid basin for a subsequent buffering. In a presently preferred embodiment the liquid basin is opened on an exit side and, using circulation means, the products which have been buffered flow further in the direction of further processing such as packaging.

In an advantageous preferred embodiment according to the present invention the basin is provided with guides for guiding products coming from the supply tube.

Providing guides enables directing of the flow in the liquid basin. The products can hereby be distributed in desired manner over the liquid basin. The guides are preferably provided pivotally for the purpose of also realizing an optimal distribution therewith over time. This pivoting adjustment can take place during a single buffering operation as well as between separate buffering operations, for instance in order to adjust these operations to a new supply of fed products.

In an advantageous preferred embodiment according to the present invention the buffering device comprises a gas supply preferably provided in the liquid basin.

The upward movement of the products in the liquid basin can be influenced by providing a gas supply. Depending on the method of gas supply, the average density in the liquid basin will decrease, whereby it is possible to exert influence on the buoyant force of the products. This achieves that a good adjustment to the products in the liquid basin is possible such that product damage is avoided as far as possible.

In a further advantageous preferred embodiment according to the present invention the basin comprises a profiled bottom for the purpose of realizing a circulating flow in the basin.

By providing a profiled bottom a circulating flow is applied in the presently preferred embodiment from the exit side of the basin, over the bottom in the direction of the entry side with the supply tube of the liquid basin, after which this circulating flow flows back along the surface and herein carries the products which have been buffered to the exit of the liquid basin. By providing the profiling, which is preferably formed as a wedge-shaped element widening in the flow direction over the bottom, wherein this wedge shape therefore forms two increasingly narrowing channels at the sides of the liquid basin, a circulating flow is initiated which also carries the products to the exit from all corners of the basin. Products are in this way prevented from remaining in the liquid basin.

The basin preferably comprises a movable bottom. It is possible here to envisage for instance a height-adjustable bottom, wherein the height of one side can for instance be adjusted in order to realize an inclining bottom. The bottom can in this way have a guiding effect on the products supplied and discharged in the basin.

In an advantageous embodiment according to the present invention the buffering device is provided with a vibrating member.

Providing a vibrating member makes it possible to loosen for instance jammed products by vibration and thereby enable further transport thereof. This prevents or obviates products being left behind and blockages. Such a vibrating member is for instance provided in the liquid basin or operatively connected to the supply tube.

In a further advantageous preferred embodiment according to the present invention the buffering device is provided with a braking flap.

By providing a braking flap, preferably arranged in the vicinity of the outflow from the supply tube, the product is slowed by the braking flap during this outflow. Such a braking flap is preferably manufactured from a flexible material, for instance from polyurethane. By slowing this speed the products will come into less hard contact with products already present in the basin. This further reduces the possibility of damage to the products. As alternative to a braking flap provided directly at the outlet, in a presently preferred embodiment a braking flap is provided substantially in the horizontal plane in the path travelled by a supplied product between the outflow opening and the water surface.

In a further advantageous preferred embodiment according to the present invention the buffering device comprises a vacuum chamber.

Providing a vacuum chamber enables the products buffered in the liquid basin to be transported directly to a crate or other packaging. It is also possible with vacuum means to realize an underpressure with which the upward force of the products in the liquid basin can be further influenced. The capacity of such a liquid basin can for instance be further influenced as a result.

The present invention also relates to a method for buffering products in substantially vertical direction, comprising of providing a buffering device as described above.

Such a method has the same effects and advantages as described for the buffering device. This buffering is preferably performed after sorting of the products and prior to packaging of the sorted products. The flexibility of the whole process is in this way increased significantly.

BRIEF DESCRIPTION OF THE DRAWINGS

Further advantages, features and details of the invention are elucidated on the basis of preferred embodiments thereof, wherein reference is made to the accompanying drawings, in which.

DETAILED DESCRIPTION OF THE INVENTION

Figure 1:
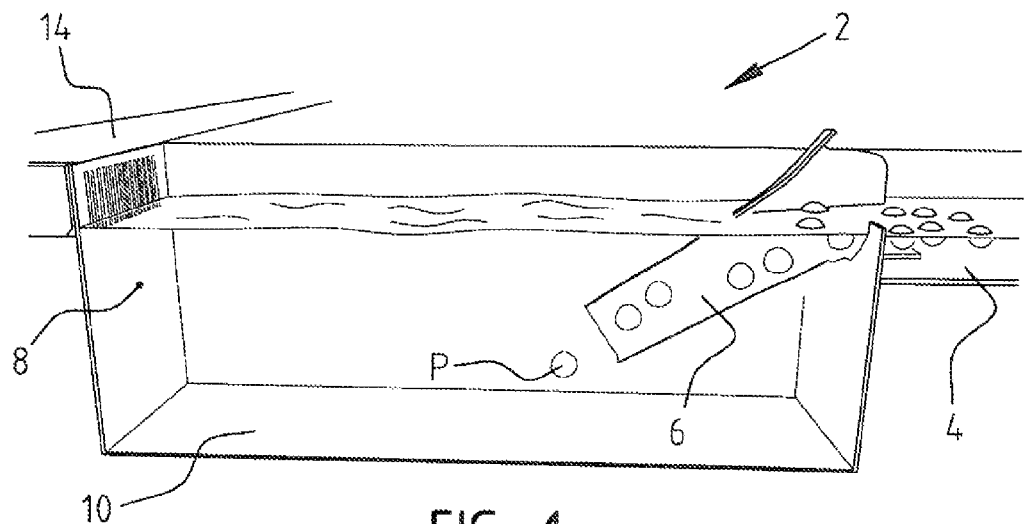
FIGS. 1-3 show a view of a buffer system according to the invention at different buffering stages.
Figure 2:
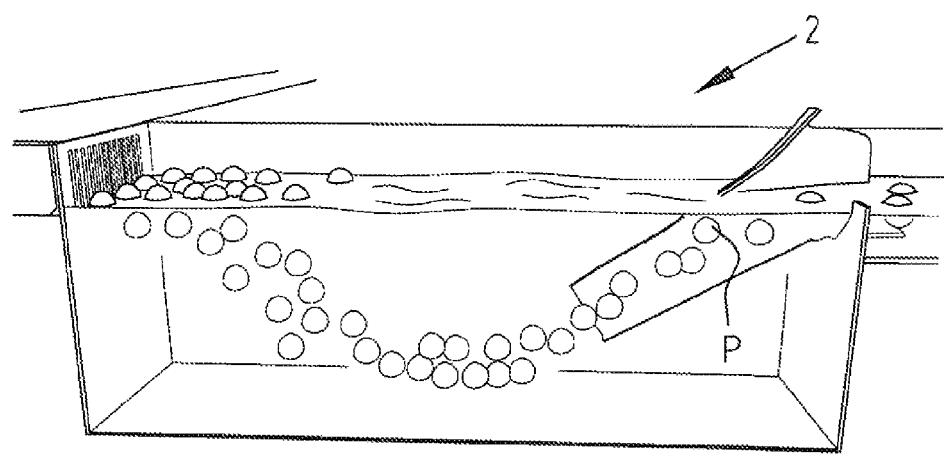
Figure 3:
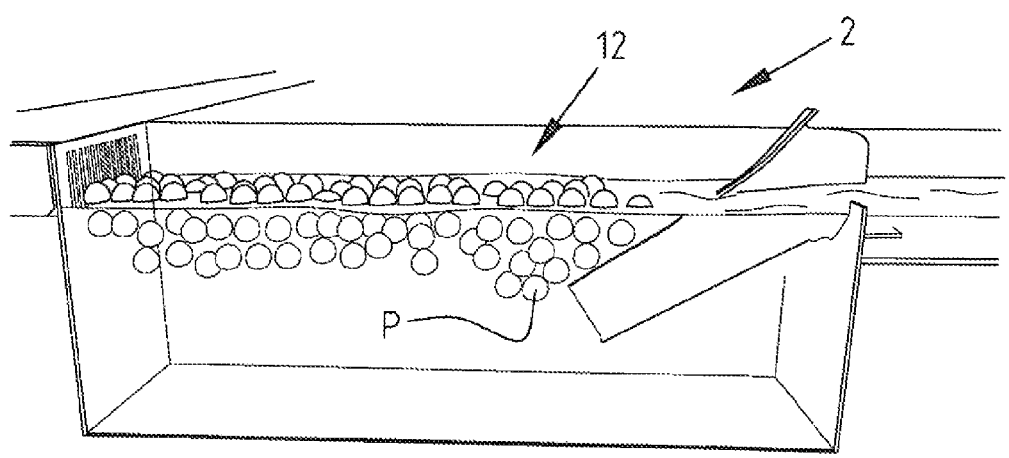

In a buffer system or buffering device 2 according to the invention (FIGS. 1-3) fruit P is supplied from a feed conduit or feed channel 4. Fruit P, such as apples, is transported via a filling tube or buffer tube 6 to the underside of a buffer vessel 10 filled with water 8. The flow is adapted here to, among other things, the type of fruit which has to be carried into buffer 10. The floating fruit accumulates in multiple layers 12 in buffer vessel 10. In the shown embodiment of device 2 the filling tube 6 has a length of about 840 millimeters. Filling tube 6 is embodied in the shown embodiment as a round pipe. Other shaped and lengths are also possible according to the invention.

In the shown embodiment a quantity of fruit P corresponding to the content of one packaging unit or transport unit is introduced into buffer 10. For apples and crates this generally amounts in practice to about 400 kg. The feed is then stopped and fruit P is transported further via a discharge channel 14 to a filling unit.

Figure 4:
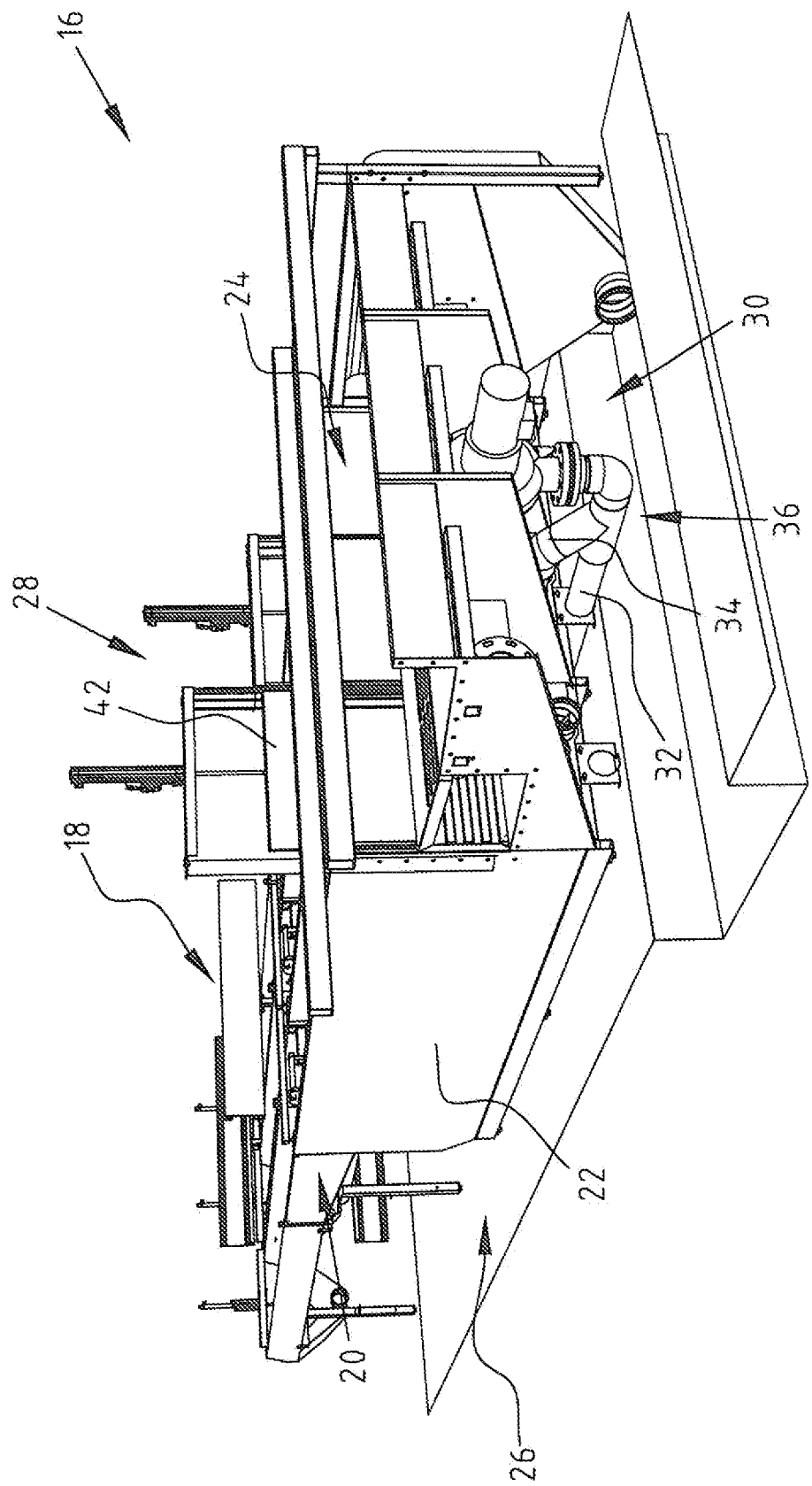
FIGS. 4-5 shows side views of a buffering device according to the invention.
Figure 5:
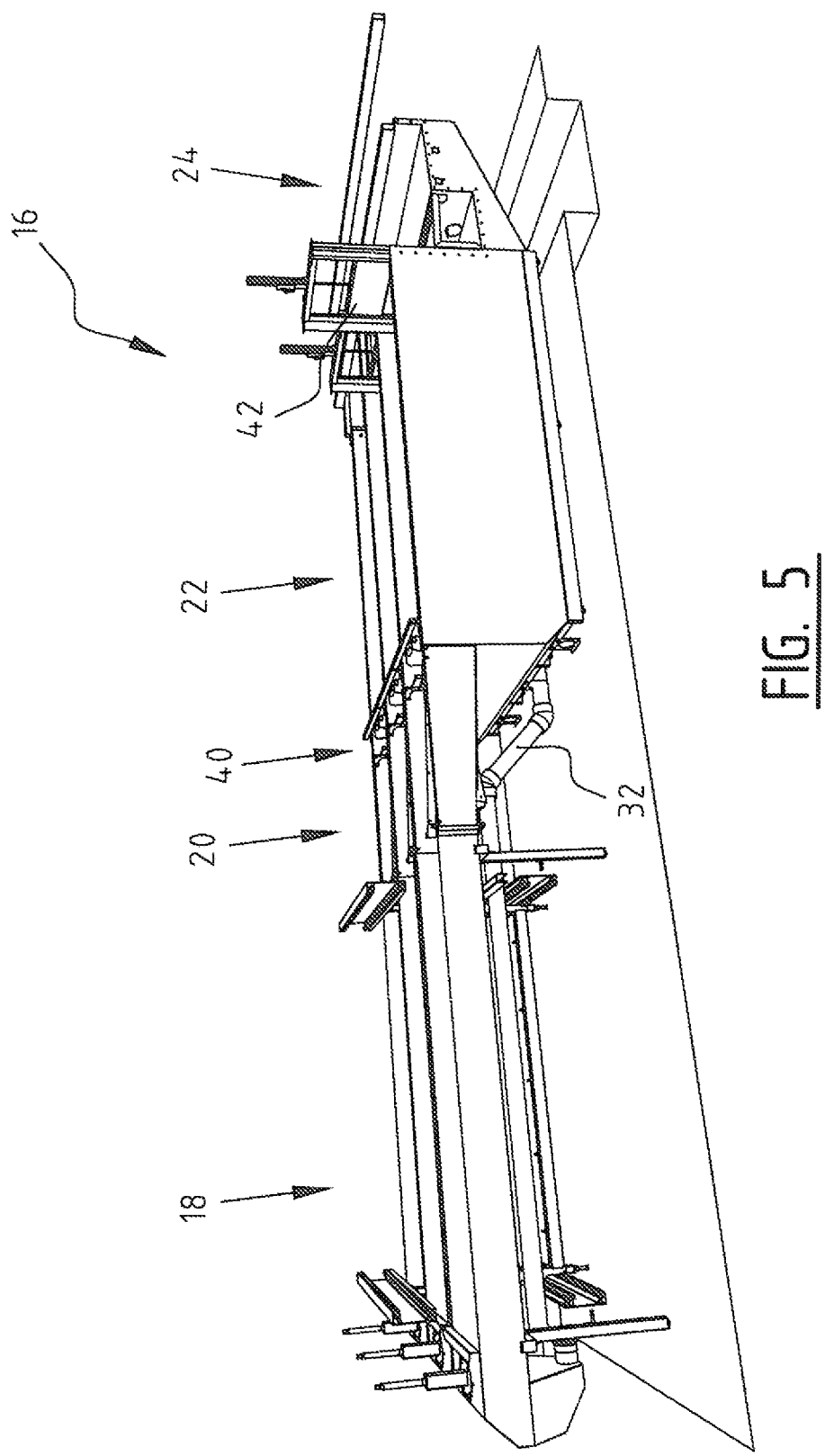

A system 16 (FIGS. 4 and 5) delivers products P via feed channel 18 which are transferred to a liquid basin 22 using filling tube section 20. Products P are further transported from basin 22 via discharge channels 24. Feed channel 18 receives products P from for instance a sorting system (not shown).

A pump system 26 provides for the liquid flow in which products P are transported from feed channel 18 to filling tube section 20 in which filling tube 28 is provided. Pump system 26 is provided with pump 30 and a first feed channel 32, with which water from basin 22 is transferred to the start of feed channel 18 using pump 30. A circulating flow is hereby realized with which fruits or products P are carried from feed channel 18 to basin 22. Pump system 26 is further provided with a second feed channel 34 with which water from basin 22 is circulated over basin 22. This is used as circulating flow over basin 22 when basin 22 is filled with products P which have to be further transported. In this case valve 36 in pump system 26 is switched so that no flow runs through feed channel 18 and the flow is circulated inside basin 22. In both flows water is supplied between basin 22 and pump 30 via supply conduit 38. The inflow of water via tube 28 is preferably stopped by closing this tube with shut-off valve 40, and valve or slide 42 is opened so that products Pare further transported out of basin 22 via discharge channel 24.

In the shown embodiment of system 16 three individual sub-systems 44, 46, 48 (FIG. 6) are provided with which it is possible, among other things, to process three classes of product P parallel to each other. In the shown embodiment a single discharge channel 24 is shown for the three individual sections 44, 46, 48. This means that a supply of buffered products P in basin 22 is released using slide 42 as soon as discharge channel 24 has processed the previous batch. Filling tube section 20 is provided with a filling tube or supply tube 28. The water in feed channel 18 is guided to the entry 52 of tube 28 using baffles 50. In the shown embodiment baffles 50 are provided such that a narrowing of feed channel 18 occurs, whereby the speed of the water is increased. The mutual distance between products P is hereby increased. Exit 54 of tube 28 is situated in basin 22.

Figure 6:
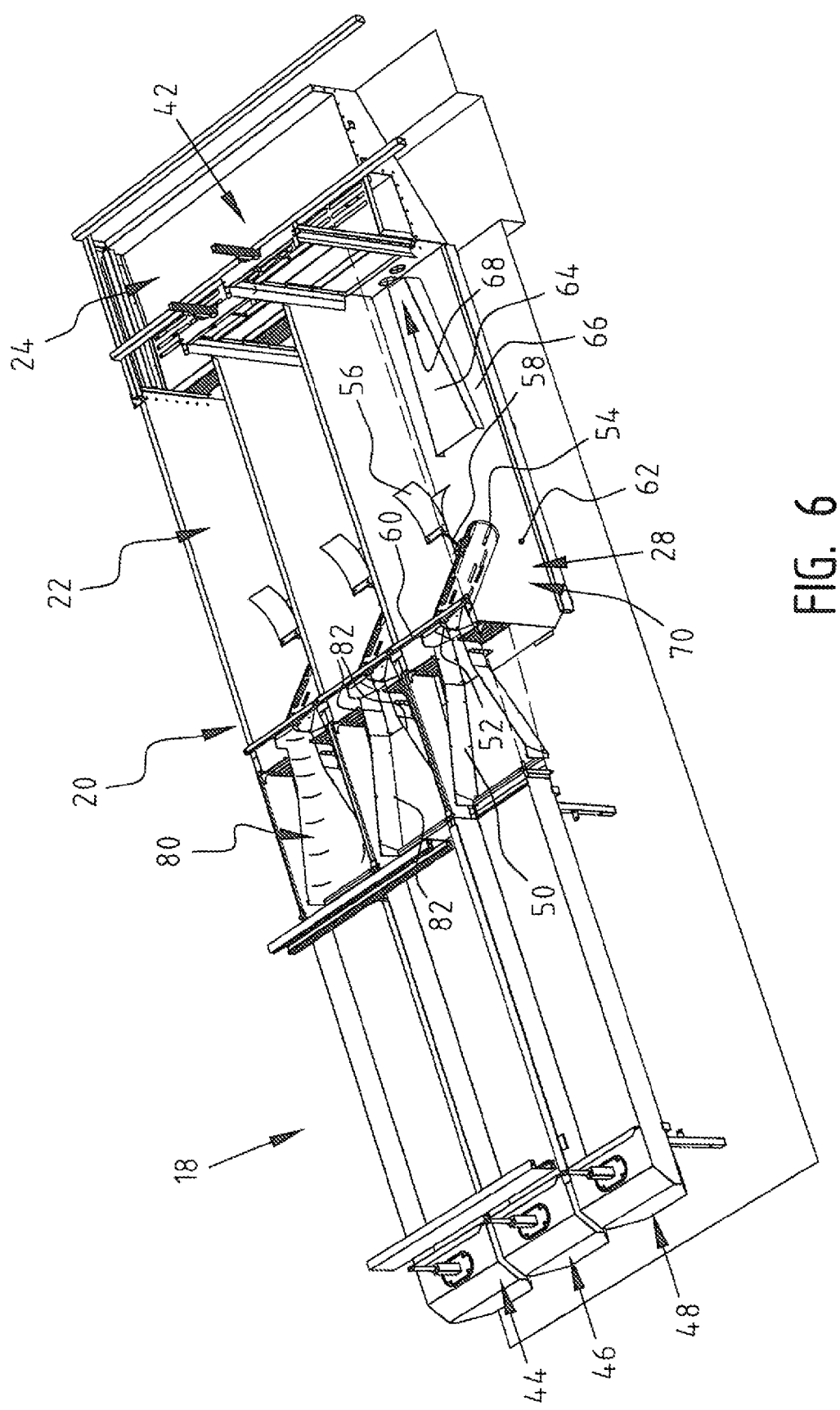
FIG. 6 is a top view of the device of FIGS. 4 and 5 with braking flap.
Figure 7:
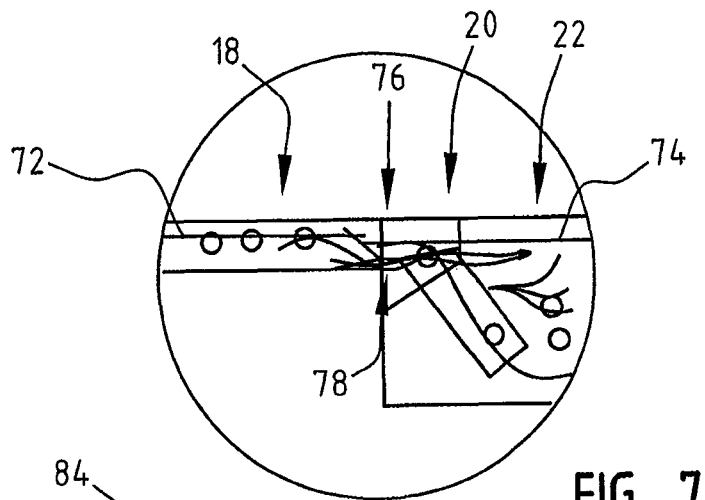
FIG. 7 is a side view of the liquid level at the transition between feed channel and liquid basin.

In the shown embodiment a braking flap 56 of polyurethane is provided close to exit 54 (FIG. 6). In the shown embodiment flap 56 is connected via connecting rod 58 to rod 60 which is situated in the vicinity of exit 54. Flap 56 is positioned such that it slows the upward movement of products P in basin 22. Bottom 62 of basin 22 is provided with a wedge-shaped profile 64, wherein channels 66 are created to the sides of profile 64, these channels narrowing from exit side 68 in the direction of entry part 70 of basin 22. Profile 64 functions particularly when basin 22 is being emptied.

In the shown embodiment the water level 72 in feed channel 18, with which products P are moved in the direction of filling tube section 20 with supply tube 28, is higher than water level 74 in basin 22. A waterfall effect is hereby realized at the position of transition 76 between feed channel 18 and filling tube 28 such that a cross-section 78 of tube 28 is wholly covered with water during use. Empty spaces in tube 28 are hereby avoided and a substantially laminar flow is realized in tube 28. Together with the increased speed of the water in tube 28 a separating effect is hereby realized, wherein products P in principle do not come into contact with each other, or hardly so. The inside of tube 28 and baffles 50 is covered here with a polyurethane protective layer 80. Protective layer 80 is fixed to the inner side of tube 28 at the position of recesses 82 provided in tube 28. Other materials and other fixings are otherwise also possible.

With buffering device 2, 16 products P are supplied from a sorting device (not shown) via feed channels 18 using pump system 26. Products are transferred from channel 18 to basin 22 using a supply tube 28 in filling section 20. The products P are carried from exit 54 of tube 28 placed into basin 22, after which they will rise and be slowed down using braking flap 56. Products P are then provided in layers 12 in basin 22. As soon as sufficient products P have been arranged in basin 22 and discharge channel 24 is clear, slide 42 can be opened. Pump system 26 switches to the circulating flow through basin 22 and transports product P to discharge channel 24. Products P are subsequently further processed, packaged or stored. Basin 2 can then be refilled with products P.

Figure 8A:
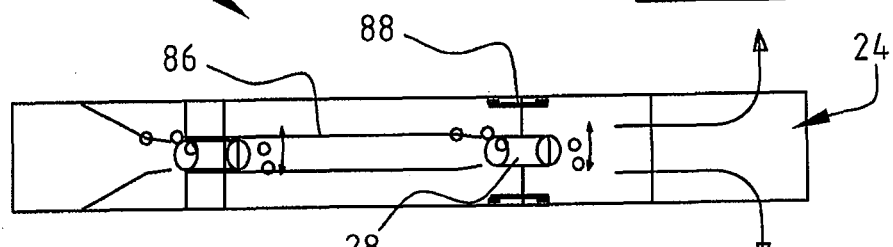
FIGS. 8A-G show views of alternative embodiments according to the invention.

In an alternative embodiment system 84 (FIG. 8A) is provided with a reciprocating tube 28, wherein tube 28 can be positioned in lengthwise direction of basin 22. The reciprocating movement of tube 28 is made possible using additional guide baffles 86 and displacing means 88. Depending on the flow through discharge channel 24, the products P are discharged in the desired direction.

Figure 8B:
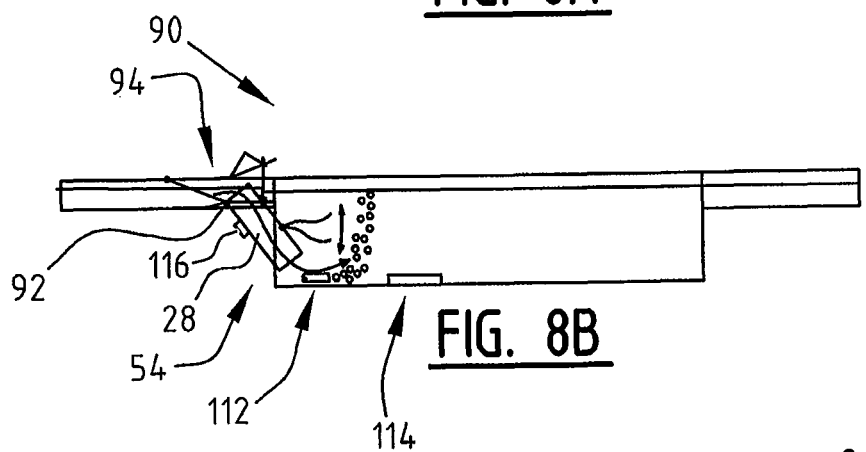

In alternative system 90 (FIG. 8B) tube 28 is provided with first pivoting means 92 for moving tube 28 up and downward. This up and downward stroke means a rotation round a substantially horizontal axis, wherein exit 54 of tube 28 is height-adjustable. Using hinge 94 a pivoting movement, or left to right movement, of tube 28 is possible in basin 22. In alternative system 90 (FIG. 8B), gas supply 112 may be included in basin 22. Gas supply 112 may be positioned on a bottom surface of basin 22. In alternative system 90 (FIG. 8B), vibrating member 114 may be positioned on a bottom surface of basin 22. Further, vibrating member 116 may be operatively connected to tube 28.

Figure 8C:
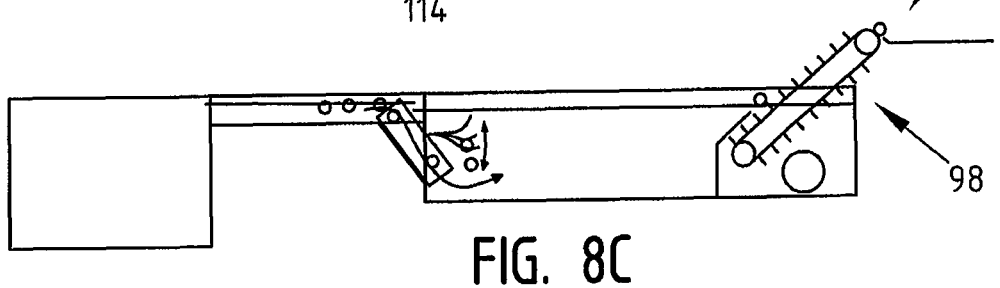
Figure 8D:
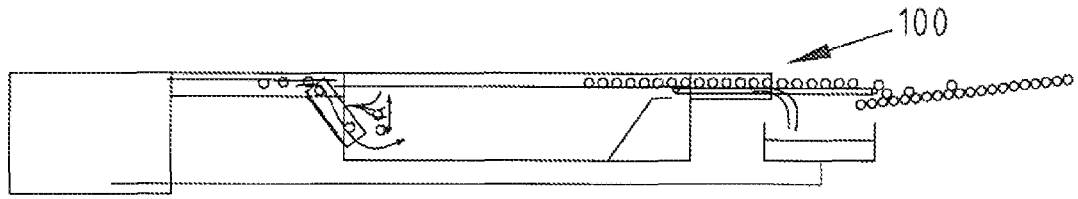
Figure 8E:
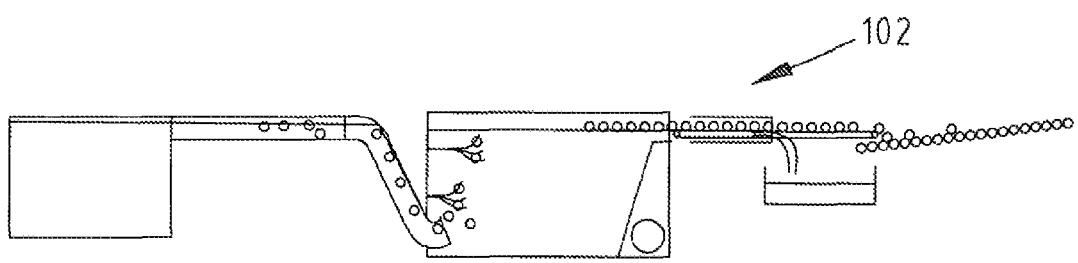
Figure 8F:
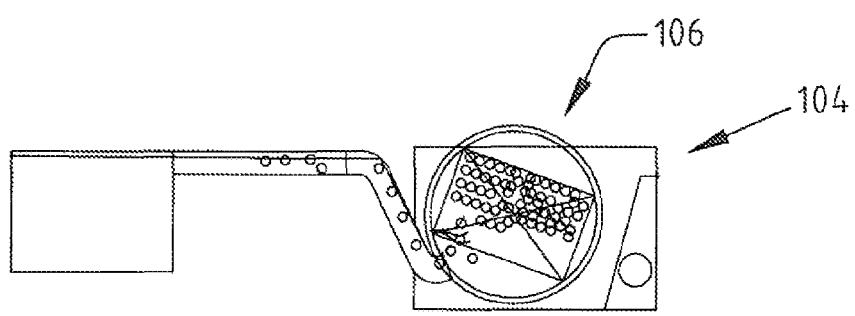
Figure 8G:
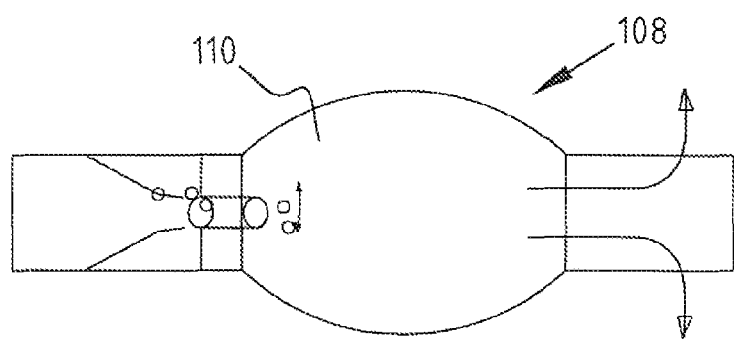

In a further alternative system 96 (FIG. 8C) discharge channel 24 is replaced by or combined with an elevator conveyor 98 for further transport of products P out of basin 22. It is also possible to replace elevator conveyor 98 with a V-belt 100 (FIG. 8D). It is possible here to as it were lengthen supply tube 28 and introduce it lower in an alternative system 102 (FIG. 8E). A stronger flow is hereby realized over the greater depth, wherein a larger buffering capacity is obtained with more thrust on the underside. In a further shown alternative system 104 (FIG. 8F) tube 28 is combined with a crate filler 106 for positioning products P directly from the basin into a crate. In one embodiment, the crate filler 106 may be configured with a vacuum chamber. A further alternative system 108 (FIG. 8G) comprises a basin 110 of an oval shape, whereby the length of basin 110 is further reduced.

The present invention is by no means limited to the above described preferred embodiments thereof. The rights sought are defined by the following claims, within the scope of which many modifications can be envisaged. It is thus expressly possible to combine diverse aspects of shown embodiments according to the invention with each other.

The invention claimed is:

1. A buffering device for floating products, comprising:
a liquid basin;
a vacuum chamber provided in the liquid basin;
a crate positioned in the vacuum chamber; and
a supply means wherein during use an entry side is operatively connected to a feed channel and an exit side of the supply means is provided below the liquid level in the basin, such that during use products are buffered substantially in vertical direction,
wherein the products are positioned in the crate directly from the supply means.

2. The buffering device as claimed in claim 1, wherein the supply means comprises a supply tube.

3. The buffering device as claimed in claim 2, wherein more than one supply tube is provided.

4. The buffering device as claimed in claim 2, wherein the supply tube is provided with a shut-off valve.

5. The buffering device as claimed in claim 1, further comprising guide means for product-friendly guiding of the supplied products, wherein the guide means are positioned on the exit side of the supply means.

6. The buffering device as claimed in claim 5, wherein the guide means comprise a liquid level regulator such that the liquid level in the feed channel fills a cross-section of the supply tube substantially wholly with liquid at the position of the change in direction of the products at the entry side of the supply tube.

7. The buffering device as claimed in claim 5, wherein during use the guide means maintain a liquid level difference between the feed channel and the basin.

8. The buffering device as claimed in claim 5, wherein the guide means comprises a conveyor belt.

9. The buffering device as claimed in claim 5, wherein the guide means are provided on or in the supply tube.

10. The buffering device as claimed in claim 1, further comprising pivoting means connected to the supply means.

11. The buffering device as claimed in claim 1, wherein the supply means are adjustable in lengthwise direction.

12. The buffering device as claimed in claim 1, wherein the basin is provided with guides for guiding product from the supply tube.

13. The buffering device as claimed in claim 12, wherein the guides are pivotable.

14. The buffering device as claimed in claim 1, further comprising a gas supply positioned on a bottom surface of the liquid basin.

15. The buffering device as claimed in claim 1, wherein the basin comprises a profiled bottom for the purpose of realizing a circulating flow in the basin.

16. The buffering device as claimed in claim 1, wherein the basin comprises a movable bottom.

17. The buffering device as claimed in claim 1, wherein a vibrating member is provided on a bottom surface of the liquid basin.

18. The buffering device as claimed in claim 1, further comprising a braking flap positioned on the exit side of the supply means.

19. The buffering device as claimed in claim 1, wherein a vibrating member is operatively connected to the supply means.

20. A method for buffering floating products in substantially a vertical direction, comprising of providing a buffering device as claimed in claim 1.

21. The method as claimed in claim 20, wherein buffering is performed after sorting of the products and prior to packaging of the sorted products.

* * * * *